United States Patent Office 3,457,211
Patented July 22, 1969

3,457,211
FORMALDEHYDE POLYMERS PLASTICIZED WITH VINYL ESTER POLYMERS
Saburo Imoto and Osamu Ohara, Kurashiki-shi, Japan, assignors to Kurashiki Rayon Co., Ltd., Kurashiki-shi, Okayama Prefecture, Japan, a corporation of Japan
No Drawing. Filed Dec. 20, 1966, Ser. No. 603,184
Claims priority, application Japan, Dec. 22, 1965, 40/79,521; Mar. 3, 1966, 41/13,269, 41/13,270
Int. Cl. C08g $37/20$, $37/32$
U.S. Cl. 260—31.2        16 Claims

ABSTRACT OF THE DISCLOSURE

A thermosetting resin composition comprising a formaldehyde-type thermosetting resin having added thereto in plasticizing amounts a polymer selected from the group consisting of polymers of a vinyl ester having the structure:

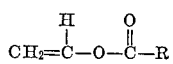

wherein R is alkyl of 1 to about 10 carbon atoms, said polymers having a polymerization degree in the range of about 100 to 3000, and saponification products of said vinyl ester polymers, said saponification products having saponification degrees of up to about 85 molar percent.

---

This invention relates to thermosetting resin compositions having good fluidity before setting and high shock resistance after setting.

Thermosetting resins such as phenol, melamine and urea resins have been extensively used as molding materials, adhesives, paints, laminates, and the like. However, the resistance of such thermosetting resins to shocks and cracking is frequently inadequate and a number of plasticizers have been developed to eliminate this shortcoming.

Generally speaking, plasticizers of low molecular weight have a disadvantage in that they are eventually dissipated with the lapse of time and thus render the resin compositions brittle. Plasticizers of high molecular weight preclude such phenomenon, but their compatibility with thermosetting resins often presents problems.

There has been a recent trend toward the adoption of injection molding in the formation of shaped articles of Formalin resins which herebefore had been compression molded. Formalin resins, however, have only limited fluidity and the shock and cracking resistance properties of molded articles from Formalin resins are further impaired by injection molding.

Attempts have been made to overcome these difficulties by the use in the resins of fillers such as wood meal, pulp powder, asbestos, mica and glass fiber, and also of polyvinyl alcohol, polyvinyl butyral and other additives to obtain increased plasticity. However, the use of these fillers has failed to be completely satisfactory.

In accordance with the present invention thermosetting resin compositions having good fluidity before setting and good resistance to shocks and cracking after setting are provided by adding to formaldehyde or Formalin-type thermosetting resins one or more plasticizers selected from the group consisting of vinyl ester polymers having polymerization degrees in the range of about 100 to 3000, and their saponification products having saponification degrees of up to about 85 molar percent.

The vinyl ester polymers and their partially saponified products useful as plasticizers in the present invention have such good compatibility with formaldehyde-type thermosetting resins that they not only give the excellent results mentioned above but also provide a luster-improving effect which has never been achieved by the conventional high molecular plasticizers. Another feature of the resin compositions of the invention is that the setting time required remains unchanged by the addition of such plasticizers.

The vinyl esters, polymers of which constitute the plasticizer additives of the invention, have the general formula

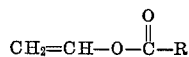

wherein R is a straight-chain or branched-chain alkyl group of 1 to about 10 carbon atoms which may be substituted with non-deleterious groups. The polymers of vinyl esters of the invention may be homopolymers or copolymers of at least two dissimilar vinyl esters having the above indicated structure. Illustrative of suitable homopolymers are those of vinyl acetate, vinyl propionate, vinyl lactate, and vinyl valerianate. Exemplary of useful vinyl ester copolymers include vinyl acetate-vinyl propionate copolymer, vinyl acetate-vinyl valerianate copolymer, vinyl acetate-vinyl propionate-vinyl lactate copolymer, and the like.

In the practice of the present invention, the greater the number of carbon atoms in the R group of the vinyl ester the better the result. Also, with a given number of carbon atoms in this R group, the straight chain alkyl groups are preferred to the branched-chain groups. It is important that the saponification products of vinyl ester homopolymers or copolymers have saponification degrees within a range of up to about 85 molar percent. Polymers having saponification degrees above this range give molding compositions having too poor a fluidity for injection molding.

The vinyl ester polymers of the invention should have polymerization degrees in the range of about 100 to 3000. For polymers having polymerization degrees below this range provide little plasticizing effect while polymerization degrees above this range produce polymers having too high a melt viscosity. The preferred polymers of the invention are those having polymerization degrees in the range of from about 100 to 600.

The polymeric plasticizers of the invention are added to the thermosetting resins in an amount sufficient to improve the resistance of the resins to shocks and crack formation. This amount may vary widely but is usually in the range of about 3 to 60% by weight or more based on the thermosetting resin. Addition of the plasticizer of the invention to the thermosetting resin can be before, during or after the condensation to the Formalin-type thermosetting resin. Also, if desired, the compositions of the invention may contain other additives or materials commonly incorporated in thermosetting resins, such as fillers, setting agents, stabilizing agents, other plasticizers, etc.

The thermosetting resins of the invention are the formaldehyde or Formalin-type thermosetting resins, that is, the thermosetting resins prepared by the condensation of formaldehyde and an organic compound containing an active, replaceable hydrogen atom. Examples of the latter are phenols and organic amino compounds. Preferably, the amino compounds have 1 to 9 carbon atoms and contain at least one, preferably two, amino groups and have at least two, preferably three, active, replaceable hydrogen atoms. Organic amino compounds are urea, melamine, guanidine and cyanamide. Ordinarily, an excess of active hydrogen-containing compound to formaldehyde is preferred in the preparation of the thermosetting resins of the invention.

Thus, illustrative of suitable thermosetting resins of the invention are phenol-formaldehyde resins, urea-formaldehyde resins, melamine-formaldehyde resins, and the like.

The invention is described in more detail in the following examples which should not be considered as limiting.

EXAMPLE 1

A reactant solution of the composition consisting of

Phenol:formaldehyde=1:0.85 (molar ratio)
Hydrochloric acid 0.2% (phenol=100%)

was heated at an initial temperature of 50° C., and the temperature was gradually increased to 90° C. The condensation reaction was conducted under these conditions for 1.5 hours and the resulting reaction product was then concentrated and dried.

To portions of the dry phenol-formaldehyde resin thus obtained, partially saponified polyvinyl acetate (polymerization degree=582) having different saponification degrees of 0, 36.6, 54.2, and 68.1 mol. percent were added separately, each in an amount of 10 wt. percent based on the phenol-formaldehyde resin. Each mixture was dissolved in a solvent (methanol except for the system to which the 68.1 mol. percent saponified polymer was added, which was dissolved in a solvent composed of methanol and water at a ratio by weight of 9:1) to a 50% solid concentration. The resulting solution was dried at room temperature and powdered by a ball mill.

To the powder was added hexamethylene tetramine (a setting agent) in an amount of 12% of the amount of the phenol-formaldehyde resin. The two were thoroughly mixed to prepare a molding powder.

Each of the molding powder samples thus prepared was pressed by a hot press at a pressure of 50 kg./cm.$^2$ and at 160° C. for 10 minutes (with subsequent degassing at about ten seconds after the pressing) and formed into a film.

The impact strength values of the films are shown in Table 1, wherein the impact strength is expressed in terms of impact height, that is, the dropping distance which a lead ball, 0.6950 gram in weight, needs to break a sheet of film fixed at both ends.

TABLE 1

| Saponif. deg. of part. saponif'd polyvinyl acetate added (mol percent) | Film thickness (mm.) | Impact height (mm.) | Softening temperature (° C.) |
|---|---|---|---|
| 0 | 0.33 | 190 | 62 |
| 36.6 | 0.38 | 210 | 62 |
| 54.2 | 0.33 | 220 | 65 |
| 68.1 | 0.34 | 180 | 67 |

A control sample of the resin, that is, containing no polyvinyl acetate or its partially saponified product, exhibited a softening point of 70° C.

EXAMPLE 2

Partially saponified polyvinyl acetate (polymerization degree=582) having a saponification degree of 56.6 mol. percent was mixed with phenol-formaldehyde resin in the same manner as in Example 1 to prepare four different film samples containing, respectively, 10, 15, 20 and 25% by weight of partially saponified polyvinyl acetate (based on the phenol-formaldehyde resin).

The samples were subjected to impact test under the same conditions described in Example 1, and gave the results shown in Table 2.

TABLE 2

| Partially saponified polyvinyl acetate (wt. percent on the basis of phenol-formaldehyde resin) | Film thickness (mm.) | Impact height (mm.) |
|---|---|---|
| 10 | 0.95 | 350 |
| 15 | 1.03 | 370 |
| 20 | 0.93 | 420 |
| 25 | 0.94 | 560 |

EXAMPLE 3

Molding powders were prepared in the same manner as in Example 1 and each sample was mixed with the same amount of finely pulverized wood, thoroughly stirred together, and formed by a hot press (at 160° C. and 50 kg./cm.$^2$ for 10 min.) into a 3 mm.-thick film. The film samples were subjected to impact test at a temperature of 20° C. and a relative humidity of 65%. The results are as shown in Table 3.

TABLE 3

| Saponif. deg. of part. saponif'd polyvinyl acetate added (mol. percent): | Impact strength [1] (Kg. cm./cm.$^2$) |
|---|---|
| 0 | 3.0–3.1 |
| 36.2 | 3.0–3.2 |
| 54.2 | 3.3–3.5 |
| 58.1 | 3.0–3.1 |
| No addition | 2.1–2.2 |

[1] Impact strength as herein used means the amount of energy needed for fracture by a weight of a film sheet, 10 mm. x 10 mm. in size, which is fixed at both ends.

EXAMPLE 4

A solution of the composition consisting of

Phenol:formalin=1:0.85 (at molar ratio)
Hydrochloric acid 0.2%/phenol was heated from an initial temperature of 50° C. gradually up to 90° C. Partially saponified polyvinyl acetate (with saponification degrees of 54.2 and 68.1 mol. percent and a polymerization degree of 360) were added to separate portions of the phenol-formaldehyde solution each in an amount of 10 wt. percent based on the phenol. Each mixture was subjected to a condensation reaction with thorough stirring, and the resulting product was concentrated, dried, and pulverized.

To the pulverized product was added hexamethylene tetramine in an amount of 12% (on the basis of the phenol-formaldehyde resin) and was thoroughly mixed to provide a homogeneous mixture.

The molding powders thus prepared were formed by a hot press under the same conditions as adopted in Example 1 to form 0.45 mm.-thick films. The films were impact tested and gave the results shown in Table 4.

TABLE 4

| Saponif. deg. of part. saponif'd polyvinyl acetate added (mol. percent): | Impact height (mm.) |
|---|---|
| 54.2 | 380 |
| 68.1 | 350 |

EXAMPLE 5

A mixture consisting of 280 g. of urea, 526 g. of 37% Formalin, and 19 g. of hexamethylene tetramine was reacted at 50° C. for one hour, and then 53 g. of ammonium chloride was added. To 90 g. portions of the resulting condensate liquid were added 40 g. each of polyvinyl acetate or its partially saponified product (with saponification degrees of 36.6, 54.2, and 68.1 mol. percent and a polymerization degree of 582) in the form of either 20% methanol or aqueous solutions (the former two additives in methanol solutions and the 68.1 mol. percent additive in aqueous solution). Each of the mixed solutions was thoroughly mixed with stirring and subjected to a condensation reaction at 90° C. for 1.5 hours. The resulting products were concentrated, dried, and pulverized. The molding powders thus prepared were formed into 0.90 mm.-thick films by a hot press at 150° C. and a pressure of 100 kg./cm.$^2$ for 5 min. and subjected to an impact strength test at a temperature of 20° C. and a relative humidity of 65%. The results are shown in Table 5.

TABLE 5

| Saponif. deg. of part. saponif'd polyvinyl acetate added (mol. percent): | Impact strength (kg. cm./cm.²) |
|---|---|
| 0 | 0.72 |
| 36.6 | 0.95 |
| 54.2 | 1.00 |
| 68.1 | 1.10 |
| Control, no addition | 0.620 |

EXAMPLE 6

Film products were obtained by the same procedure described in Example 1 except that polyvinyl acetates having polymerization degrees of 85, 582, 2400 and 3450 were used instead of partially saponified polyvinyl acetate (polymerization degree=582) having saponification degrees of 36.6, 54.2 and 68.1 mol. percent as used in Example 1.

The film samples were tested for impact strength and for apparent viscosity at 150° C. by a high polymer flow tester. The results obtained are given in Table 6.

TABLE 6

| Polym. deg. of polyvinyl acetate added | Film thickness (mm.) | Impact strength (kg. cm./cm.²) | Apparent viscosity (poise) |
|---|---|---|---|
| 85 | 0.33 | 0.120 | 232 |
| 582 | 0.33 | 0.280 | 521 |
| 2,400 | 0.35 | 0.250 | 1835 |
| 3,450 | 0.34 | 0.250 | 2580 |
| Control, no addition | 0.33 | 0.110 | 2275 |

EXAMPLE 7

To a mixture of 100 g. of phenol and 73 g. of 37% Formalin was added hydrochloric acid in an amount of 0.2% of the total weight of phenol. At an initial temperature of 50° C. the whole mixture was reacted with a gradual increase in the temperature up to 90° C. over a period of 1.5 hours. The reacted solution was neutralized with an aqueous solution containing 25% by weight of caustic soda. With the addition of 100 g. of a 10 wt. percent methanol solution of a copolymer of 70 mol. percent vinyl acetate and 30 mol. percent vinyl propionate, the whole mixture was concentrated and dried at 60° C. and pulverized by a ball mill. The powder was mixed with 100 g. of hexamethylene tetramine and 100 g. of wood meal and kneaded together by a hot roll (at a roll temperature of 110°–120° C.) for 10 minutes. Then, the mixture was formed into 3 mm.-thick film by a hot press (at 160° C. and 70 kg./cm.² for 10 min.). The film exhibited an impact strength of 2.41 kg. cm./cm.², which was markedly greater than the 2.13 kg. cm./cm.² value of a system which did not contain the copolymer.

EXAMPLE 8

Ninety grams of urea-formaldehyde resin mixed with 10 g. of 70 mol. percent vinyl acetate-30 mol. percent vinyl propionate copolymer (polymerization degree=600) was dissolved in an aqueous solution containing 50 wt. percent methanol, and the solution was concentrated and dried to a solid at 60° C. The dry product was pulverized by a ball mill and, with the addition of 0.1 g. of ammonium chloride and 50 g. of wood meal, the mixture was kneaded by a hot roll.

A film was then formed from the mixture in the same manner described in Example 7.

The impact strength of this film product was 5.67 kg. cm./cm.², and appreciably greater than the value 5.31 kg. cm./cm.² of a system which did not contain the copolymer.

EXAMPLE 9

Partially saponified products (with saponification degrees of 21.5, 48.2 and 70.5 mol. percent) of a 70 mol. percent vinyl acetate-30 mol. percent vinyl propionate copolymer (polymerization degree=600) were added, 10 g. each, to 90 g. portions of urea-formaldehyde resin, and the mixtures were respectively dissolved in a 50 wt. percent aqueous solution of methanol and concentrated and dried at 60° C. The dried products were pulverized by a ball mill and each was kneaded with 0.1 g. of ammonium chloride and 50 g. of wood meal by a hot roll. Films were then obtained using the same procedure described in Example 7.

The films were tested for impact strength and gave the results shown in the following table.

| Saponification degree of copolymer added (mol. percent): | Impact strength (kg. cm./cm.²) |
|---|---|
| 21.5 | 5.68 |
| 48.2 | 5.68 |
| 70.5 | 5.67 |

EXAMPLE 10

Ninety grams of urea-formaldehyde resin was mixed with 10 g. of a polymer of vinyl propionate (polymerization degree=1500) and the mixture was dissolved in a 50 wt. percent aqueous solution of methanol and concentrated and dried at 60° C. The dried matter was pulverized by a ball mill and kneaded with 0.1 g. of ammonium chloride and 50 g. of wood meal by a hot roll. The mixture was then formed by a hot press (at 160° C. and 70 kg./cm.² for 10 min.) into a 3 mm.-thick film. The impact strength of this film was 5.61 kg. cm./cm.², appreciably higher than the 5.31 kg. cm./cm.² of a control which did not contain the high molecular plasticizer.

EXAMPLE 11

One hundred grams of phenol and 78 g. of 37% Formalin were mixed and, with the addition of hydrochloric acid in an amount of 0.2 wt. percent of the total weight of phenol, the whole mixture was reacted at an initial temperature of 50° C. with a gradual increase in the temperature up to 90° C. over a period of 1.5 hours. The reacted solution was neutralized with an aqueous solution containing 25% by weight of caustic soda and, with the addition of 100 g. of a 10 wt. percent methanol solution of a polymer of vinyl valerianate (polymerization degree=1200), the mixture was concentrated and dried at 60° C. and pulverized by a ball mill. To the pulverized matter were added 10 g. of hexamethylene tetramine and 100 g. of wood meal, and the mixture was kneaded by a hot roll (at a roll temperature of 110°–120° C.) for 10 minutes and then formed by a hot press (at 160° C. and 70 kg./cm.² for 10 min.) into a 3 mm.-thick film. The film showed an impact strength of 2.62 kg. cm./cm.², which was distinctly higher than the 2.13 kg. cm./cm.² value exhibited by a system not containing the plasticizer.

EXAMPLE 12

Films 3 mm. in thickness, were obtained using the same conditions and procedure of Example 10 except that 10 g. of a polymer of vinyl propionate was replaced by 10 g. each of three differently saponified products (with saponification degrees of 20.5 mol. percent, 45.2 mol. percent and 75.8 mol. percent) of polyvinyl propionate (polymerization degree=800). The products were tested for impact strength and gave the following results.

| Saponif. deg. of part. saponif'd polyvinyl propionate (mol percent): | Impact strength (kg. cm./cm.²) |
|---|---|
| 20.5 | 5.69 |
| 45.2 | 5.72 |
| 75.8 | 5.70 |

The embodiments in which an exclusive property or privilege is claimed are as follows:

1. A thermosetting resin composition comprising a formaldehyde-type thermosetting resin selected from the group consisting of formaldehyde-phenol thermosetting resin, formaldehyde-urea thermosetting resin and formaldehyde-melamine thermosetting resin having added thereto in plasticizing amounts of about 3 to 60 percent by weight of the formaldehyde-type thermosetting resin a polymer selected from the group consisting of polymers of a vinyl ester having the structure:

$$CH_2=\underset{H}{\overset{|}{C}}-O-\overset{O}{\overset{\|}{C}}-R$$

wherein R is alkyl of 1 to about 10 carbon atoms, said polymers having a polymerization degree in the range of about 100 to 3000, and saponification products of said vinyl ester polymers, said saponification products having saponification degrees of up to about 85 molar percent.

2. The composition of claim 1 wherein the polymer is a homopolymer.

3. The composition of claim 1 wherein the polymer is a copolymer of at least two dissimilar vinyl esters having the structure:

$$CH_2=\underset{H}{\overset{|}{C}}-O-\overset{O}{\overset{\|}{C}}-R$$

wherein R is alkyl of 1 to about 10 carbon atoms.

4. The composition of claim 2 wherein the homopolymer is partially saponified and has a saponification degree of up to about 85 molar percent.

5. The composition of claim 3 wherein the copolymer is partially saponified and has a saponification degree of up to about 85 molar percent.

6. The composition of claim 2 wherein the homopolymer is polyvinyl acetate.

7. The composition of claim 4 wherein the partially saponified homopolymer is polyvinyl acetate.

8. The composition of claim 1 wherein the formaldehyde type thermosetting resin is a formaldehyde-phenol thermosetting resin and the polymer is a partially saponified homopolymer having a saponification degree of up to 85 molar percent.

9. The composition of claim 1 wherein the formaldehyde type thermosetting resin is a formaldehyde-urea thermosetting resin and the polymer is a partially saponified homopolymer having a saponification degree of up to 85 molar percent.

10. The composition of claim 1 wherein the formaldehyde type thermosetting resin is a formaldehyde-phenol thermosetting resin and the polymer is a partially saponified copolymer of at least two dissimilar esters having the structure:

$$CH_2=\underset{H}{\overset{|}{C}}-O-\overset{O}{\overset{\|}{C}}-R$$

wherein R is alkyl of 1 to about 10 carbon atoms, said partially saponified copolymer having a saponification degree of up to 85 molar percent.

11. The composition of claim 1 wherein the formaldehyde type thermosetting resin is a formaldehyde-phenol thermosetting resin and the polymer is a homopolymer.

12. The composition of claim 1 wherein the formaldehyde type thermosetting resin is a formaldehyde-phenol thermosetting resin and the polymer is a copolymer of at least two dissimilar esters having the structure:

$$CH_2=\underset{H}{\overset{|}{C}}-O-\overset{O}{\overset{\|}{C}}-R$$

wherein R is alkyl of 1 to about 10 carbon atoms.

13. The composition of claim 1 wherein the formaldehyde type thermosetting resin is a formaldehyde-urea thermosetting resin and the polymer is a homopolymer.

14. The composition of claim 1 wherein the formaldehyde type thermosetting resin is a formaldehyde-urea thermosetting resin and the polymer is a copolymer of at least two dissimilar esters having the structure:

$$CH_2=\underset{H}{\overset{|}{C}}-O-\overset{O}{\overset{\|}{C}}-R$$

wherein R is alkyl of 1 to about 10 carbon atoms.

15. A thermosetting resin composition comprising a formaldehyde-type thermosetting resin selected from the group consisting of formaldehyde-phenol thermosetting resin and formaldehyde-organic amino compound thermosetting resin, said organic amino compound having 1 to 9 carbon atoms and at least one amino group, said resin having added thereto in plasticizing amounts of about 3 to 60 percent by weight of the formaldehyde-type thermosetting resin a polymer selected from the group consisting of polymers of a vinyl ester having the structure:

$$CH_2=\underset{H}{\overset{|}{C}}-O-\overset{O}{\overset{\|}{C}}-R$$

wherein R is alkyl of 1 to about 10 carbon atoms, said polymers having a polymerization degree in the range of about 100 to 3000, and saponification products of said vinyl ester polymers, said saponification products having saponification degrees of up to about 85 molar percent 16. The composition of claim 15 wherein the organic compound is an organic amino compound and has two or three active replaceable hydrogen atoms.

References Cited

UNITED STATES PATENTS

| | | | |
|---|---|---|---|
| 2,889,297 | 6/1959 | Brandner et al. | 260—844 |
| 2,902,458 | 9/1959 | Teppema | 260—844 |
| 2,959,474 | 11/1960 | Daniels et al. | 260—844 |

MORRIS LIEBMAN, Primary Examiner

L. T. JACOBS, Assistant Examiner

U.S. Cl. X.R.

260—844, 851